Aug. 25, 1936.                    P. NIELSEN                    2,051,999
                              WINDSHIELD DEFROSTER
                     Filed Feb. 3, 1936            2 Sheets-Sheet 1
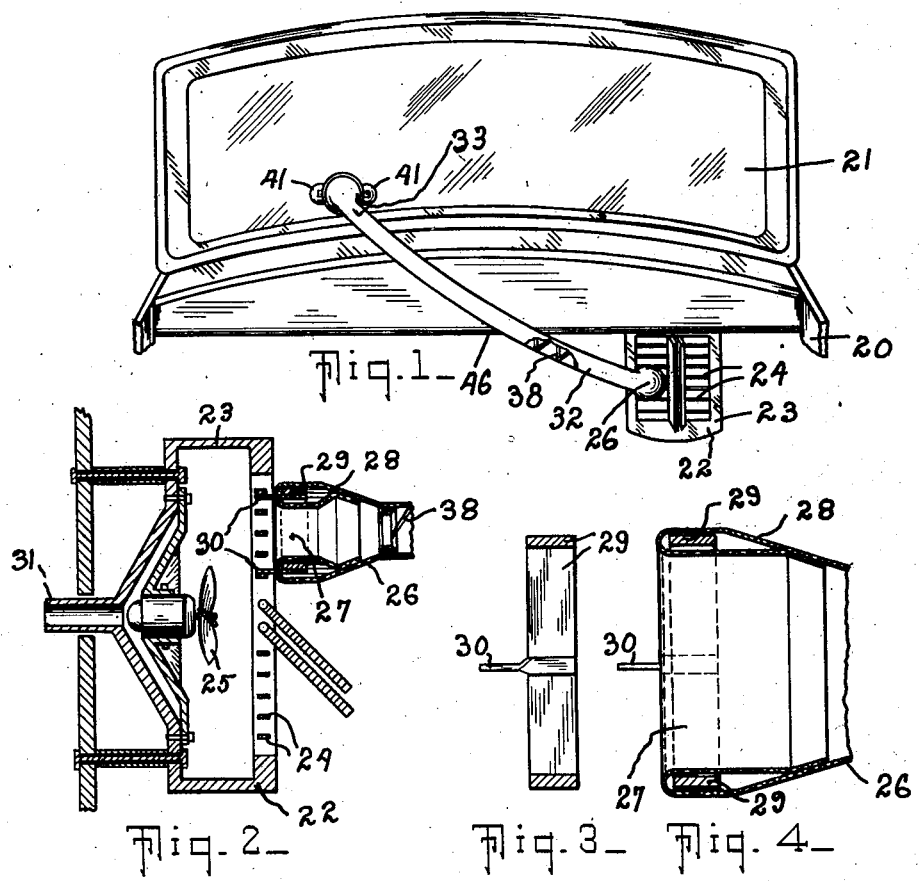
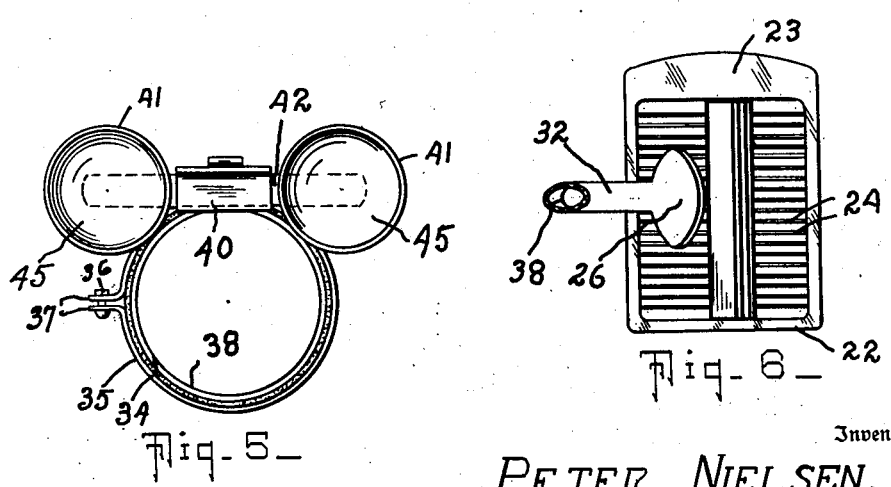
Inventor
PETER NIELSEN.
By Hiram A. Sturges
                    Attorney Aug. 25, 1936.    P. NIELSEN    2,051,999
WINDSHIELD DEFROSTER
Filed Feb. 3, 1936    2 Sheets-Sheet 2
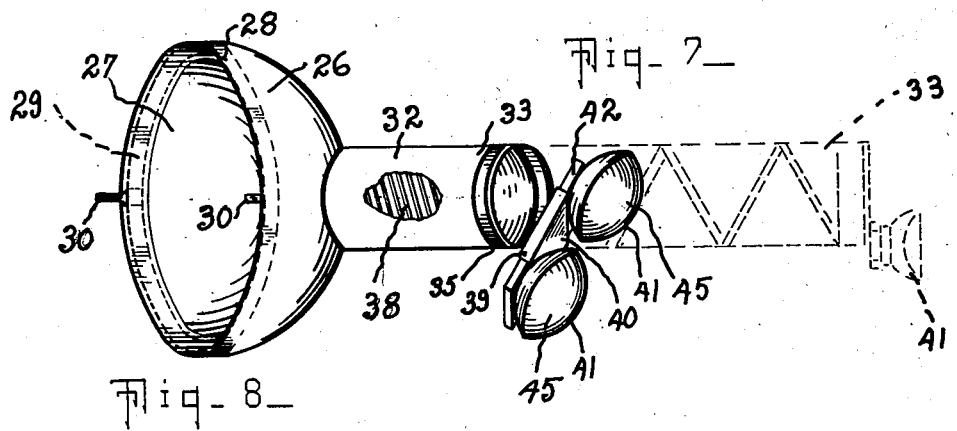
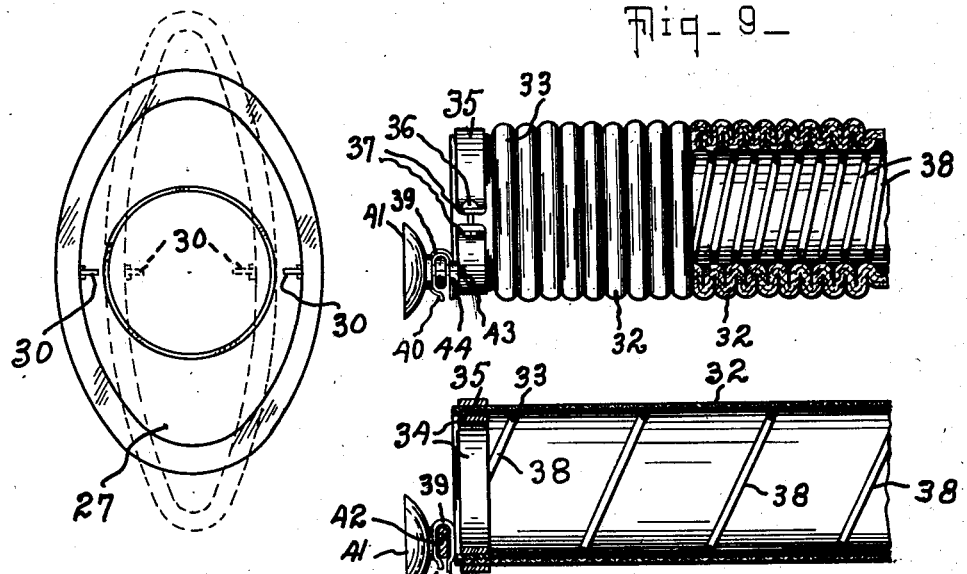
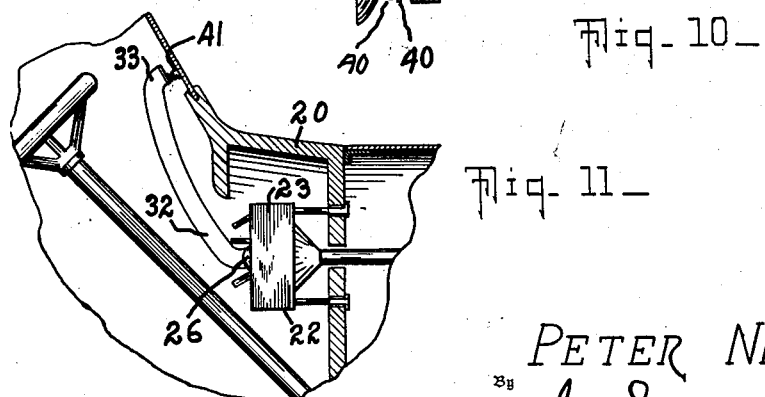
Inventor
PETER NIELSEN.
By Hiram A. Sturges
Attorney Patented Aug. 25, 1936

2,051,999

UNITED STATES PATENT OFFICE 2,051,999

WINDSHIELD DEFROSTER

Peter Nielsen, Omaha, Nebr., assignor to Jubilee Manufacturing Co., Omaha, Nebr., a corporation of Nebraska Application February 3, 1936, Serial No. 62,133

4 Claims. (Cl. 20—40.5)

This invention relates to windshield warmers or defrosters for automobiles of that type used in conjunction with a hot air heater for the interior of a closed automobile body, and has for an object to provide an inexpensive construction which is adapted to be compactly folded when not in use, readily attached to several different types of heaters and extended for delivering warm air to a selected portion of a windshield glass.

Another object of the invention is to provide a collapsible device manufactured primarily of cloth or fabric having means within the tube thereof which is so arranged that the cloth tube is kept open longitudinally during use for a free and unobstructed transmission therethrough of heated air, said means being collapsible with the tube for storage purposes and susceptible of ready extension with the tube for application and subsequent use.

A further object of the invention is to provide means for removably securing the free end of the tube adjacent to a windshield glass, parts of said means being readily detachable from other parts thereof whereby warm air may be selectively applied to a windshield at desired times, or directed against the operator's hands or feet or toward other occupants of the automobile or portions of the interior of the latter.

Other objects and advantages of the invention will be understood from the following description and more particularly pointed out in the claims appended hereto.

In the drawings Figure 1 is an elevation of an automobile windshield, heater and a fragment of an automobile body and showing the present invention applied thereto in a position of use.

Figure 2 is a transverse vertical section of an automobile heater and having an end of the tube of the present invention attached thereto.

Figure 3 is a transverse sectional view of an annular spring employed.

Figure 4 is a sectional view of a receiver employed provided at its mouth with the spring shown in Figure 3.

Figure 5 is a plan view of an attaching means employed for removably securing an end of a heat directing tube to a windshield.

Figure 6 is an enlarged front elevation of the heater shown in Figure 1.

Figure 7 is a perspective view of the present invention in a contracted position and ready to be further folded for storage purposes.

Figure 8 is a plan view of the mouth of a receiver employed.

Figure 9 is a side view of an end portion of a tube employed and shown partly in section.

Figure 10 is a longitudinal section of the tube shown in Figure 9.

Figure 11 is a longitudinal sectional view of a fragment of an automobile body and showing the heater therefor with the new device applied thereto in a position of use with respect to a windshield.

In the drawings like symbols refer to like or corresponding parts and referring to the drawings by reference numerals 20 indicates the closed body of an automobile having a glass windshield 21, and a heater 22. The windshield warmer or defroster of the present invention is adapted to cooperate with any of the types of automobile heaters shown in Figures 1 to 2 inclusive as well as with other types of heaters as later explained.

The heaters shown in the drawings usually include a shell 23 having either horizontally, vertically or diagonally positioned grills 24 through which hot air is delivered as circulated by a fan 25, the latter being best shown in Figure 2. The air circulated by the fan is heated while passing through the coils or between the fins of a radiator, not shown, the latter being heated by hot water or electrically. Also the present invention is adapted to cooperate with that type of heater which employs a simple pipe in communication with the interior of the body of the automobile, and having an air intake end adjacent to the exhaust manifold of the engine of the automobile, said manifold heating the air as the latter passes through said pipe.

The new device includes a cloth or fabric receiver 26 having an open mouth 27. A hem 28 is provided adjacent said mouth within which is positioned an annular spring 29, as best shown in Figure 4. The spring is provided with oppositely disposed and outwardly extending pins or detents 30, said pins, as best shown in Figure 7, being adapted to be inserted through the open work grill 24 of a heater at times when the annular spring is compressed between the fingers whereby when released the pins are normally urged away from each other by the spring, causing the pins to engage against and grip the grill for positioning the mouth of the receiver cooperatively against said grill for receiving hot air therein as delivered by the heater.

Similarly the pins or detents 30 are adapted to be spread against the inner annular wall and end portion of a pipe, such as the pipe 31 shown in Figure 2 for receiving warm air therefrom in instances when a vehicle is equipped with a plain pipe heater, it being an object of the invention to provide a device which is adapted to cooperate with the more conventional types of automobile heaters and of fairly universal applicability.

A cloth or fabric tube 32 is stitched or otherwise suitably secured to the receiver whereby warm air from the heating device may be communicated to it and is provided with a free end 33 having, as best shown in Figure 5, a frame for holding said end open.

The frame includes an inner annular ring 34 and an outer ring 35, the latter being compressed towards and about the inner ring and squeezing the cloth therebetween, said compression being consummated by means of tightening a bolt 36 which extends between the lugs 37 formed at the free ends of the outer ring 35.

A coiled spring 38 is positioned within the tube 32, the ends thereof being respectively fastened to one end of the tube by stitching and the other end squeezed between the rings 34 and 35 or otherwise suitably secured, said spring being adapted to contract and extend with the tube. The spring 38 functions to keep the passageway through the tube open at all times when in use. Adjacent the free end of the tube 33 and carried by the frame a resilient clip 39 is provided. The clip 39 may be formed integral with the inner ring 34 or carried by the latter and is provided with oppositely disposed fingers 40 which are resilient and normally urged towards each other.

A pair of vacuum cups 41 are preferably employed and secured together in spaced apart relation by means of a bar 42 which extends between them, said bar being secured to the cups by means of bolts 43 and nuts 44. The heads of the bolts being seated within said cups at the time the latter are moulded.

The cups are formed of rubber and when pressed against a flat, smooth surface such as a windshield glass the air is forced from in under their concaved surfaces 45, causing said cups to adhere to the windshield glass on a portion thereof selected by the operator whereby the clip 39 may be removably attached to the bar 42 for positioning the free end 33 of the tube operatively adjacent the windshield glass while at the same time said free end 33 and the clip 39 may be readily removed at desired times away from the bar 42 and without detaching the cups 41 from the glass, said removal being desirable in instances where the operator desires to warm his hand or to direct heated air to other portions of the vehicle than its windshield and also at times when it is desired to store the device with the exception of the vacuum cups, the latter preferably remaining attached to the windshield glass in the initial, selected position during the entire cold weather season since, as often is the case, in instances where the windshield glass is too greasy or dusty the cups do not adhere readily thereto, whereby when once seated it is not convenient to disturb the same unnecessarily.

In operation the receiver or the intake end of the tube is secured in cooperative relation with the heater of the automobile by compressing the annular spring 29 for moving the detent pins 30 toward each other as shown by the dotted lines in Figure 9, said pins being inserted into the end of a heat pipe and upon the spring being released the pins 30 spring away from each other and grip the inner annular wall of said pipe in instances where the vehicle is provided with said pipe type of heater. Similarly the pins may be affixed to the grill work of other types of heaters as heretofore explained. The vacuum cups 41 being in place, as shown in Figure 1, the tube 32 is then extended to said cups and secured to the bar 42 for directing heated air upon the windshield glass 21. The coiled spring 38 maintaining the tube open longitudinally while in use and at times when the tube is fully extended, as shown in Figure 1, and when of lesser length as shown in Figure 8 and also at times when the tube contacts against the lower edge of the dashboard 46 of the vehicle as shown in Figure 1, said spring preventing portions of said tube from becoming bent towards other portions thereof such as would obstruct a free passage of air through the tube.

It will be noted that as thus described the device of the present invention may be readily attached to or removed from an automobile; folded compactly for storage when not in use and readily extended for fitting various distances between different types of automobile heaters and windshield glasses for defrosting the latter and providing clear vision therethrough for decreasing the hazards of winter driving.

I claim:—

1. A device for directing heated air to a windshield comprising in combination with the heater, a cloth receiver having an annular spring at its mouth provided with oppositely disposed detents normally urged away from each other by said spring, said detents adapted to secure said receiver to said heater, a cloth tube connected at one end with the receiver, a coiled spring in said tube for keeping said tube open longitudinally, a frame for the free end of said tube provided with a resilient clip, and vacuum cups adapted to be attached to a selected portion of said windshield and provided with a connecting bar, said clip adapted to be removably attached to said bar for supporting the free end of the tube adjacent to the windshield.

2. An automobile windshield defroster, comprising a collapsible tube adapted to be folded compactly when not in use, a receiver at one end of said tube adapted to be connected to a source of supply of heated air for said automobile, and collapsible means for keeping the tube open during use, the end of said tube opposite to said receiver end adapted to be held adjacent said windshield for delivering heated air thereto as received from said source.

3. An automobile windshield defroster for use in conjunction with the air heater of said automobile, comprising a collapsible tube having an open end adapted to be connected to said heater for receiving hot air therefrom, the other end of said tube adapted to be held adjacent said windshield for delivering said hot air thereto, and collapsible means for keeping said tube open during said delivery.

4. The combination of an automobile provided with a heater for the interior thereof, a windshield defroster comprising a receiver having resilient means for attaching it to said heater, a collapsible tube having an end in communication with said receiver, a coiled spring in said tube for keeping said tube open, and means for removably securing the other end of said tube to the windshield.

PETER NIELSEN.